(12) United States Patent
Daggubati (10) Patent No.: US 11,632,302 B2
(45) Date of Patent: *Apr. 18, 2023

(54) SYSTEM FOR OPTIMIZING BANDWIDTH DURING AN ONLINE MEETING

(71) Applicant: Kishore Daggubati, Danville, CA (US)

(72) Inventor: Kishore Daggubati, Danville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/812,725

(22) Filed: Jul. 15, 2022

(65) Prior Publication Data

US 2022/0360498 A1   Nov. 10, 2022

Related U.S. Application Data (63) Continuation of application No. 17/331,659, filed on May 27, 2021, now Pat. No. 11,444,839.

(51) Int. Cl.
*H04L 41/0896* (2022.01)
*H04L 65/403* (2022.01)

(52) U.S. Cl.
CPC ........ *H04L 41/0896* (2013.01); *H04L 65/403* (2013.01)

(58) Field of Classification Search
CPC .................. H04L 41/0896; H04L 65/403
USPC ....................................................... 709/204
See application file for complete search history.

*Primary Examiner* — Wing F Chan
*Assistant Examiner* — Leon Y Tseng (57) ABSTRACT

The system for optimizing bandwidth during an online meeting comprises data processing systems associated with a user comprising a processor module, a digital client and a digital client display interface, wherein the processor module causes the digital client to publish an audio-visual stream comprising a video component and an audio component from the corresponding data processing system. The system further comprises a first data processing system, among the data processing systems. The first data processing system is configured to receive an instruction to optimize the bandwidth by limiting the number of data processing systems from which an audio-visual stream is to be played on a first digital client display interface of the first data processing system. Further, the first data processing system may play, in the first digital client display interface, an audio-visual stream from each of the number of data processing systems as instructed by the first user.

18 Claims, 12 Drawing Sheets

SYSTEM FOR OPTIMIZING BANDWIDTH DURING AN ONLINE MEETING

BACKGROUND

Field of Invention

The disclosed subject matter relates to the field of video conferencing. More particularly, but not exclusively, the subject matter relates to bandwidth optimization in video conferencing.

Discussion of Related Field

With the ever increasing internet consumption and improvement in communication systems, video conferencing has aided in connecting people across the globe. Video conferencing has made it possible for a person to connect and communicate with people around the world from the comforts of one's own home. Recent surveys show that the usage of video conferencing to connect with people has skyrocketed and thus has become an indispensable part of life. Video conferencing has found its way into various fields including education, business, healthcare so on and so forth.

Typically, in a video conference, multiple users connect with each other through a central server, wherein the video and audio pertaining to each users is shared with every other participants of the video conferencing. It is well known that for an effective video conferencing, internet connection with substantial enough bandwidth is essential. An internet with sufficient bandwidth enables in receiving of video call data from the other participants without deterioration thereby maintain a good quality of video conferencing.

However, not everyone has access to internet with good bandwidth. If the bandwidth of the internet is not good enough, the quality of the video conference may deteriorate drastically thereby negatively affecting the effectiveness of the video conference. Further, more the number of participants in a video conference higher the bandwidth consumption. Hence, in an internet with less bandwidth, with the increase in the number of participants in a video conference the quality of the video call will drop.

In view of the foregoing, it is evident that there is a need for a system that can effectively optimize the bandwidth of a video conference without compromising on the quality of the video conference.

SUMMARY

In one embodiment, a system for optimizing bandwidth during an online meeting is disclosed. The system comprises a plurality of data processing systems, wherein each of the plurality of data processing systems is associated with a user. Each of the plurality of data processing systems comprises a processor module, a digital client and a digital client display interface, wherein the processor module causes the digital client to publish an audio-visual stream comprising a video component and an audio component from the corresponding data processing system. The system further comprises a first data processing system, among the plurality of data processing systems, wherein the first data processing system comprises a first processor module, a first digital client and a first digital client display interface. The first data processing system is configured to receive an instruction to optimize the bandwidth, from a first user associated with the first data processing system, by limiting the number of data processing systems from which an audio-visual stream is to be played in the first digital client display interface. Further, the first data processing system may play, in the first digital client display interface, an audio-visual stream from each of the number of data processing systems as instructed by the first user . . .

BRIEF DESCRIPTION OF DRAWINGS

Embodiments are illustrated by way of example and not limitation in the figures of the accompanying drawings, in which like references indicate similar elements and in which.

DETAILED DESCRIPTION

The following detailed description includes references to the accompanying drawings, which form a part of the detailed description. The drawings show illustrations in accordance with example embodiments. These example embodiments, which may be herein also referred to as "examples" are described in enough detail to enable those skilled in the art to practice the present subject matter. However, it may be apparent to one with ordinary skill in the art, that the present invention may be practised without these specific details. In other instances, well-known methods, procedures and components have not been described in detail so as not to unnecessarily obscure aspects of the embodiments. The embodiments can be combined, other embodiments can be utilized, or structural, logical, and design changes can be made without departing from the scope of the claims. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated.

Figure 1:
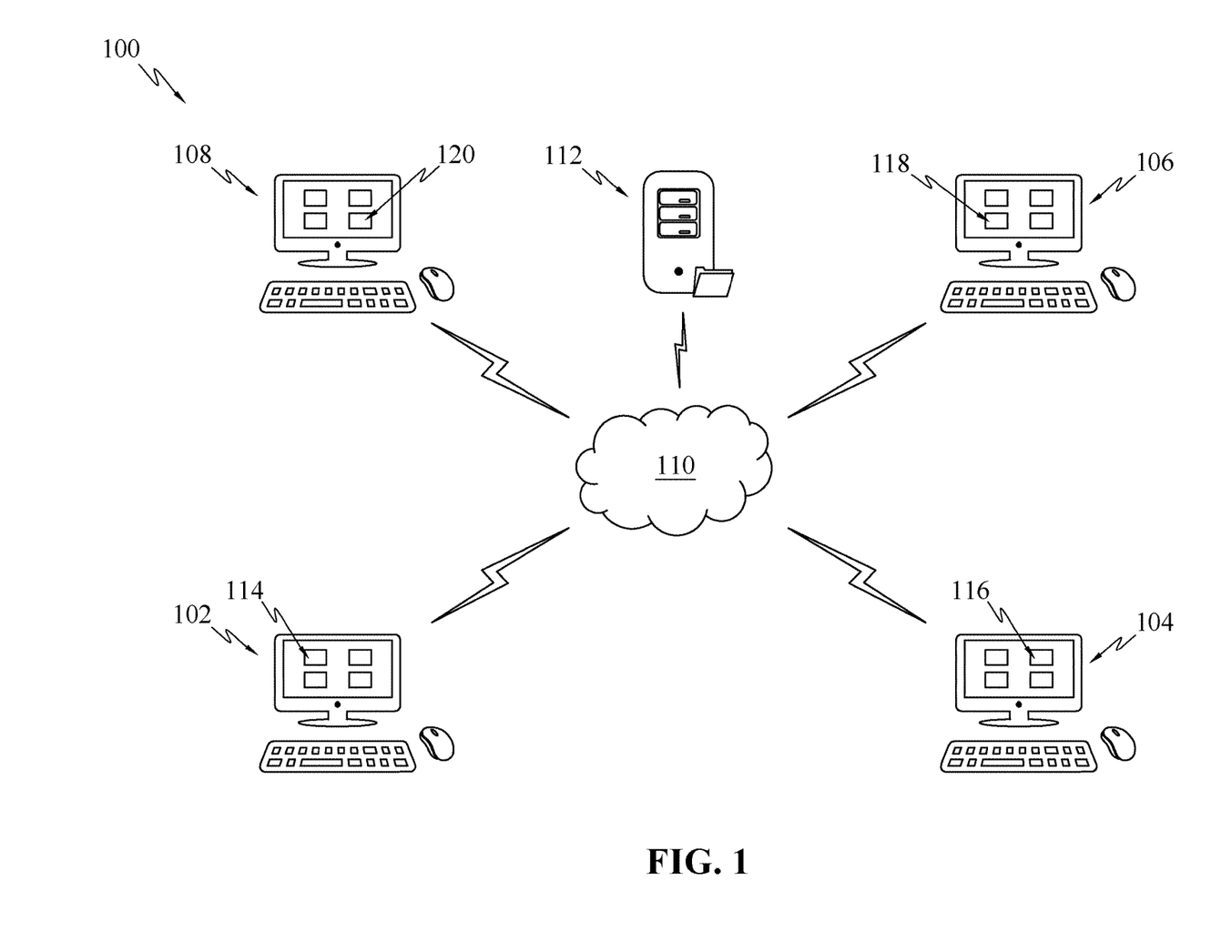
FIG. 1 illustrates a system 100 for optimizing bandwidth during an online meeting, in accordance with an embodiment.

FIG. 1 illustrates a system 100 for optimizing bandwidth during an online meeting, in accordance with an embodiment. The system 100 may comprise a first data processing system 102, a second data processing system 104, a third data processing system 106 and a fourth data processing system 108, among a plurality of data processing systems, a communication network 110 and a remote server 112. Each of the data processing systems may be associated with a user and be configured to publish an audio-visual stream. The first data processing system 102 may publish a first audio-visual stream 114 and similarly the second data processing system 104 may publish a second audio-visual stream 116, the third data processing system 106 may publish a third audio-visual stream 118 and the fourth data processing system 108 may publish a fourth audio-visual stream 120. The audio-visual stream published from the data processing systems may comprise an audio component and a video component.

In one embodiment, the video component and the audio component of the audio-visual stream published from each of the plurality of data processing systems may be obtained from a camera and a microphone respectively of the corresponding data processing system.

In one embodiment, the plurality of data processing systems may include, but not limited to, desktop computer, laptop, smartphone or the like.

Figure 2:
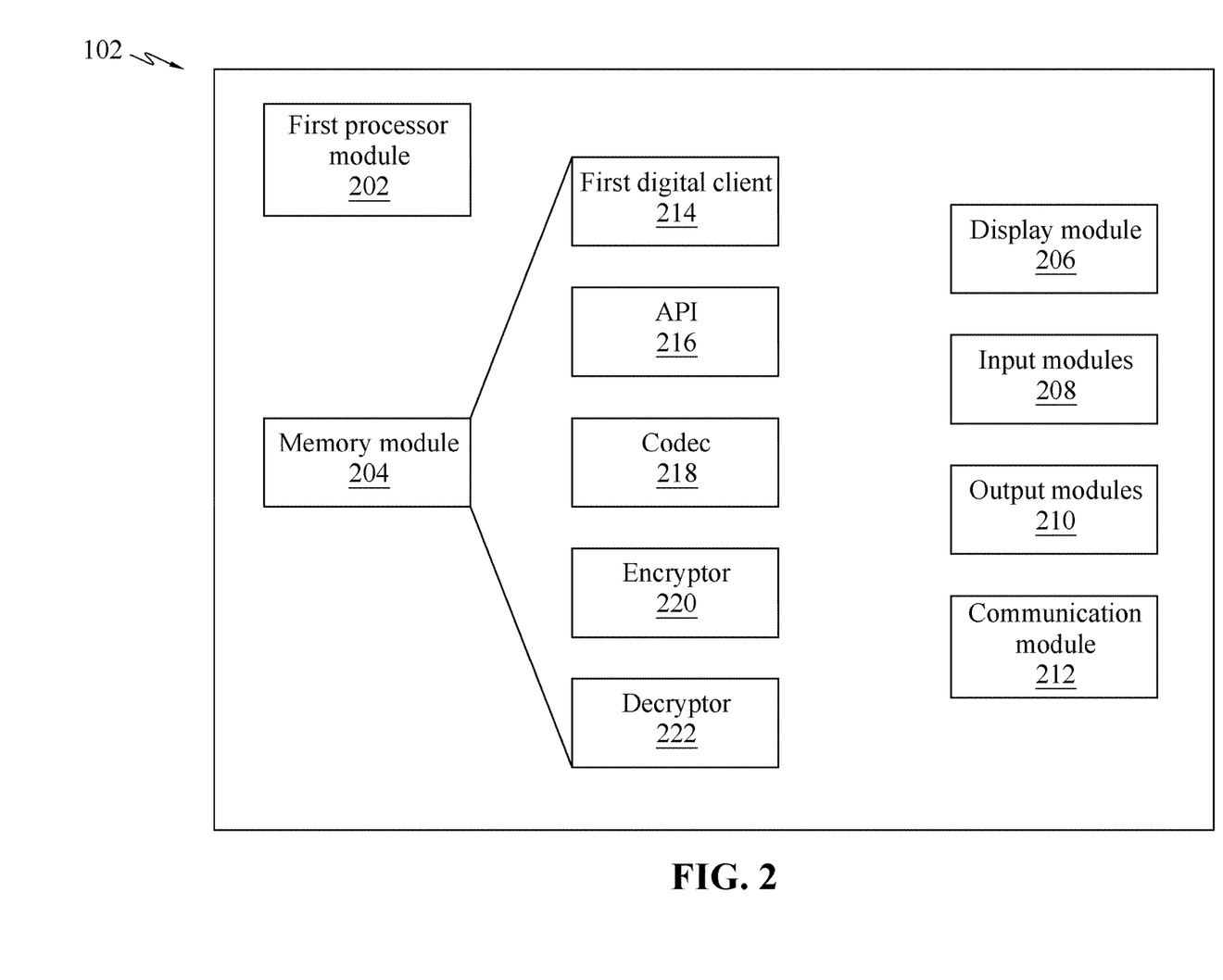
FIG. 2 is a block diagram illustrating a first data processing system 102 102, in accordance with an embodiment.

FIG. 2 is a block diagram illustrating a first data processing system 102, in accordance with an embodiment. The first data processing system 102 may comprise a first processor module 202, a memory module 204, a display module 206, input modules 208, output modules 210 and a communication module 212.

The first processor module 202 may be implemented in the form of one or more processors and may be implemented as appropriate in hardware, computer-executable instructions, firmware, or combinations thereof. Computer-executable instruction or firmware implementations of the first processor module 202 may include computer-executable or machine-executable instructions written in any suitable programming language to perform the various functions described.

The memory module 204 may include a permanent memory such as hard disk drive, may be configured to store data, and executable program instructions that are implemented by the processor module. The memory module 204 may be implemented in the form of a primary and a secondary memory. The memory module 204 may store additional data and program instructions that are loadable and executable on the first processor module 202, as well as data generated during the execution of these programs. Further, the memory module 204 may be volatile memory, such as random-access memory and/or a disk drive, or non-volatile memory. The memory module 204 may comprise of removable memory such as a Compact Flash card, Memory Stick, Smart Media, Multimedia Card, Secure Digital memory, or any other memory storage that exists currently or may exist in the future.

In an embodiment, the memory module 204 may further comprise a first digital client 214, an Application Programming Interface (API) 216, a codec 218, an encryptor 220 and a decryptor 222. The first digital client 214 may be a web browser or a software application enabling multiple screen sharing simultaneously, wherein the first digital client 214 may further comprise a first digital client display interface. The first digital client interface may enable the interaction of the user with the data processing system. The codec 218 may include computer-executable or machine-executable instructions written in any suitable programming language to perform compress outgoing data and decompress incoming data. The encryptor 220 may encrypt the data being sent and decryptor 222 may decrypt the incoming data.

The display module 206 may displays an image, a video, or data to a user. For example, the display module 206 may include a panel, and the panel may be an LCD, LED or an AM-OLED.

The input modules 208 may provide an interface for input devices such as keypad, touch screen, mouse and stylus among other input devices. In an embodiment, the input modules 208 includes a camera and a microphone.

The output modules 210 may provide an interface for output devices such as display screen, speakers, printer and haptic feedback devices, among other output devices.

The communication module 212 may be used by the first data processing system 102 102 to communicate with the remote server 112. The communication module 212, as an example, may be a GPRS module, or other modules that enable wireless communication.

It may be noted that the second data processing system 104, the third data processing system 106 and the fourth data processing system 108 may have a similar architecture as that of the first data processing system 102.

Figure 3:
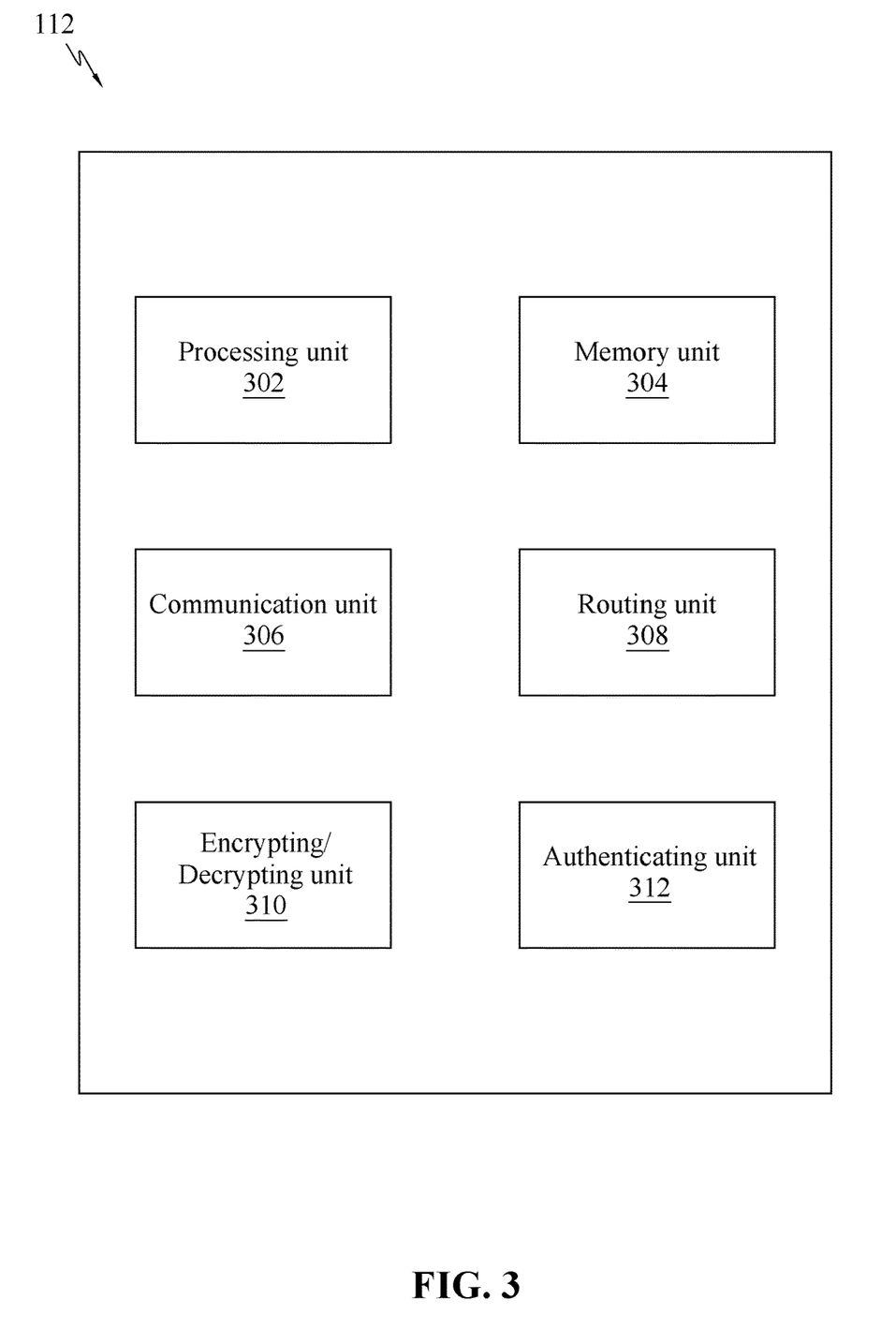
FIG. 3 is a block diagram illustrating a remote server 112, in accordance with an embodiment.

FIG. 3 is a block diagram illustrating a remote server 112, in accordance with an embodiment. The remote server 112 may comprise a processing unit 302, a memory unit 304, a communication unit 306, a routing unit 308, an encrypting/decrypting unit 310 and an authenticating unit 312.

The processing unit 302 may be implemented in the form of one or more processors and may be implemented as appropriate in hardware, computer-executable instructions, firmware, or combinations thereof. Computer-executable instruction or firmware implementations of the processing unit 302 may include computer-executable or machine-executable instructions written in any suitable programming language to perform the various functions described.

The memory unit 304 may include a permanent memory such as hard disk drive, may be configured to store data, and executable program instructions that are implemented by the processor module.

The communication unit 306 may be used by the remote server 112 to communicate with the first data processing system 102 and the second data processing system 104. The communication unit 306, as an example, may be a GPRS module, or other modules that enable wireless communication.

The routing unit 308 may enable identification of data processing systems to which the data must be transmitted.

The encrypting/decrypting unit 310 may encrypt the incoming data from each of the data processing systems and decrypt the outgoing data from the remote server 112.

The authenticating unit 312 may authenticate each of the data processing systems before establishing a connection.

Figure 4A:
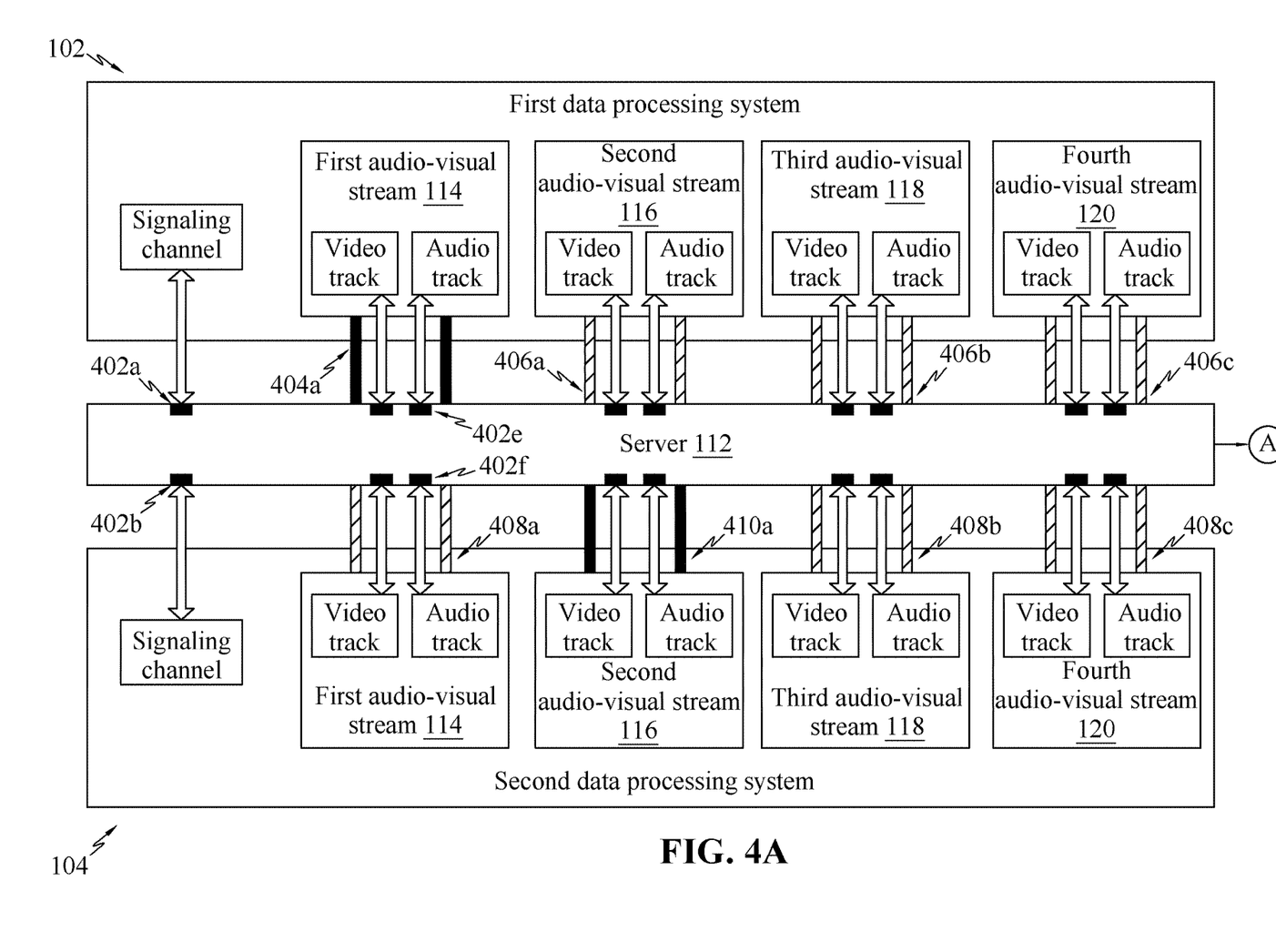
FIGS. 4A and 4B illustrates an architecture of a system 100 for optimizing bandwidth during an online meeting, in accordance with an embodiment.
Figure 4B:
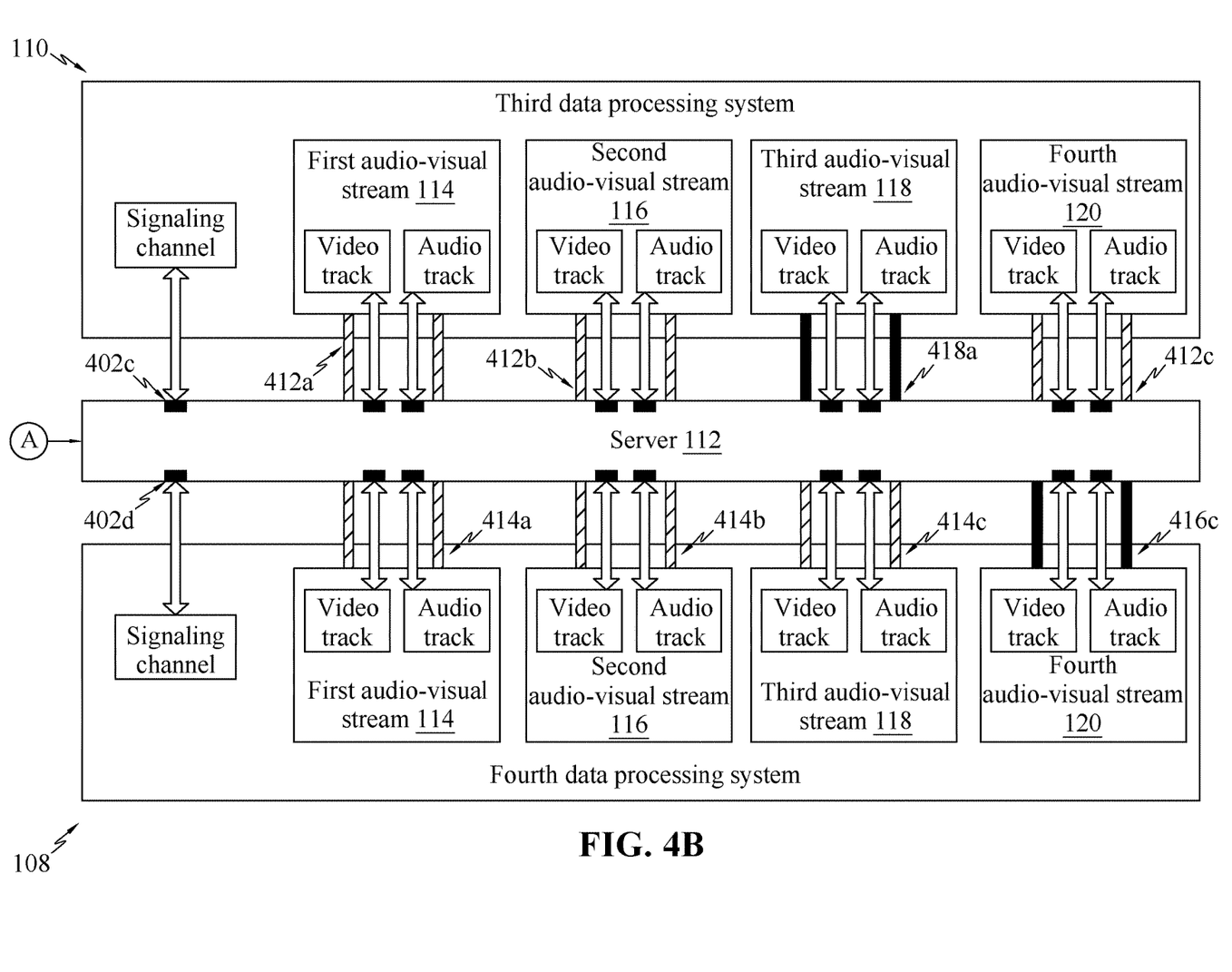

FIGS. 4A and 4B illustrates an architecture of a system 100 for optimizing bandwidth during an online meeting, in accordance with an embodiment. Each of the data processing systems may establish a connection with the remote server 112 via a UDP socket (402*a*, 402*b*, 402*c* and 402*d*) using a signalling channel, wherein each of the data processing systems may be authenticated using the authenticating 312 unit of the remote server 112 before establishing a connection. The routing unit 408 of the remote server 112 may obtain the IP addresses of each of the data processing systems and establish a connection between the data processing systems for an online meeting.

Upon establishing the connection, each of the data processing systems may publish an audio-visual stream. The audio-visual stream may comprise a video component obtained from a web camera and an audio component obtained from a microphone of the data processing system.

In one embodiment, the digital client of each of the data processing systems may create a publishing data channel (404*a*, 410*a*, 414*a*, 416*c*) for the audio-visual stream, wherein each of the first publishing data channels may publish the audio-visual stream published by the digital client.

In one embodiment, each of the publishing data channels (404*a*, 410*a*, 418*a*, and 416*a*) may comprise a video track and an audio track, wherein each of the video track and the audio track of each publishing data channel forms a UDP socket (402*e* and 4020 with the remote server 112 to publish the audio-visual stream from the data processing systems.

In one embodiment, the digital client of each of the data processing systems may create a receiving data channel (406*a*, 406*b*, 406*c*, 408*a*, 408*b*, 408*c*, 412*a*, 412*b*, 412*c*, 414*a*, 414*b* and 414*c*) for each of the audio-visual streams published by the other data processing systems, wherein each of the receiving data channels may receive the audio-visual stream published by the digital client of each of the data processing systems.

Figure 5:
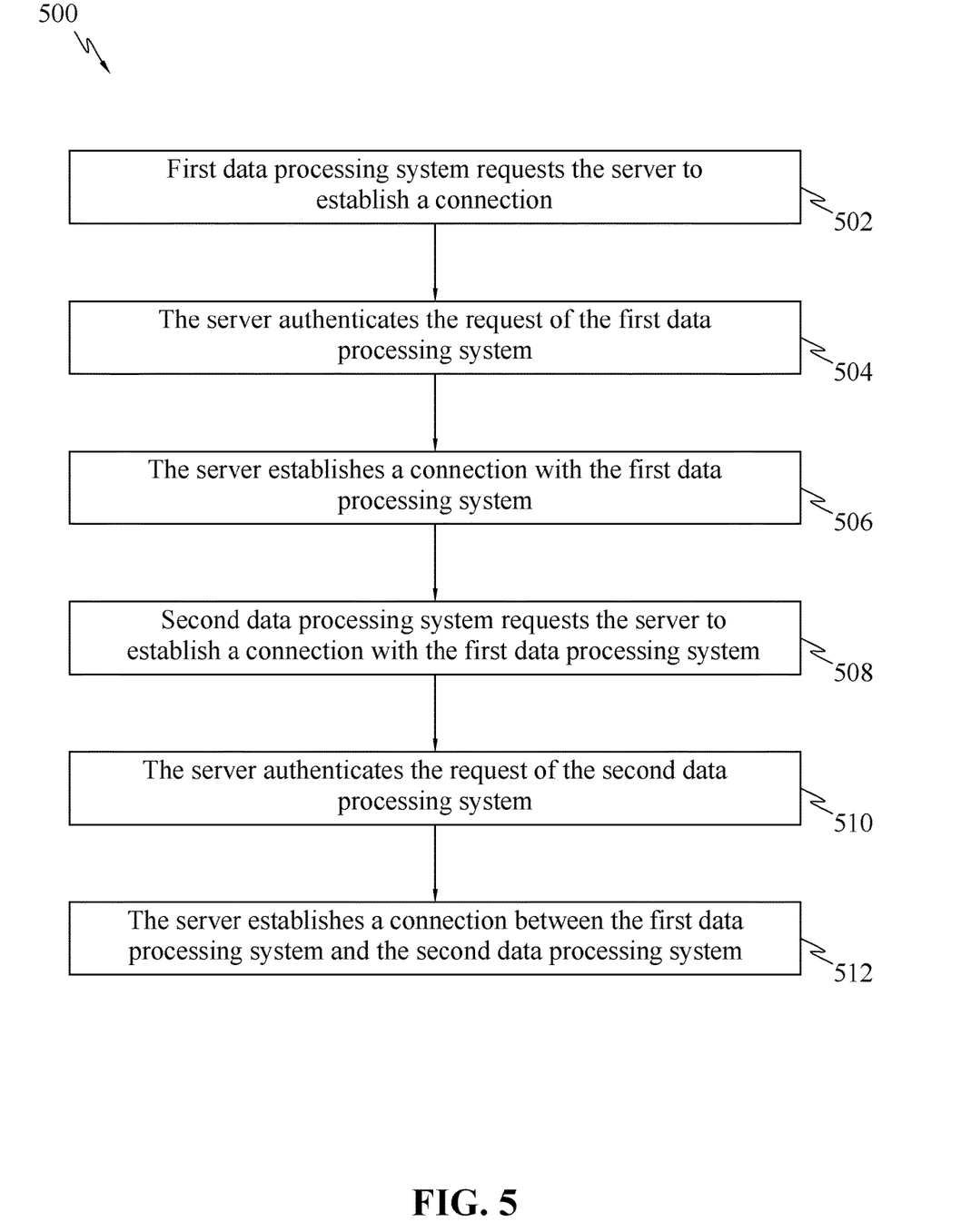
FIG. 5 is a flowchart of process of establishing a connection between the data processing systems.

FIG. 5 is a flowchart of process of establishing a connection between the data processing systems. For the purpose of comprehension, the flowchart describes the method of establishing connection between two data processing systems. At step 502, the first data processing system 102 may request the remote server 112 to establish a connection. The first data processing system 102 may send a series of messages or commands requesting the remote server 112 to establish a connection.

At step 504, the remote server 112 may receive the request from the first data processing system 102 and may authenticate the request using the authenticating unit 312.

At step 506, after successful authentication, the remote server 112 may establish a connection with the first data processing system 102 via the signalling channel.

At step 508, the second data processing system 104 may request the remote server 112 to establish a connection with the first data processing system 102. As an example, the second data processing system 104 may provide an online meeting identifier for connecting with the first data processing system 102.

At step 510, the remote server 112 may authenticate the request received from the second data processing system 104 using the authenticating unit 312.

At step 512, after successful authentication, the remote server 112 may establish a connection between the first data processing system 102 and the second data processing system 104 using the signalling channels.

Figure 6:
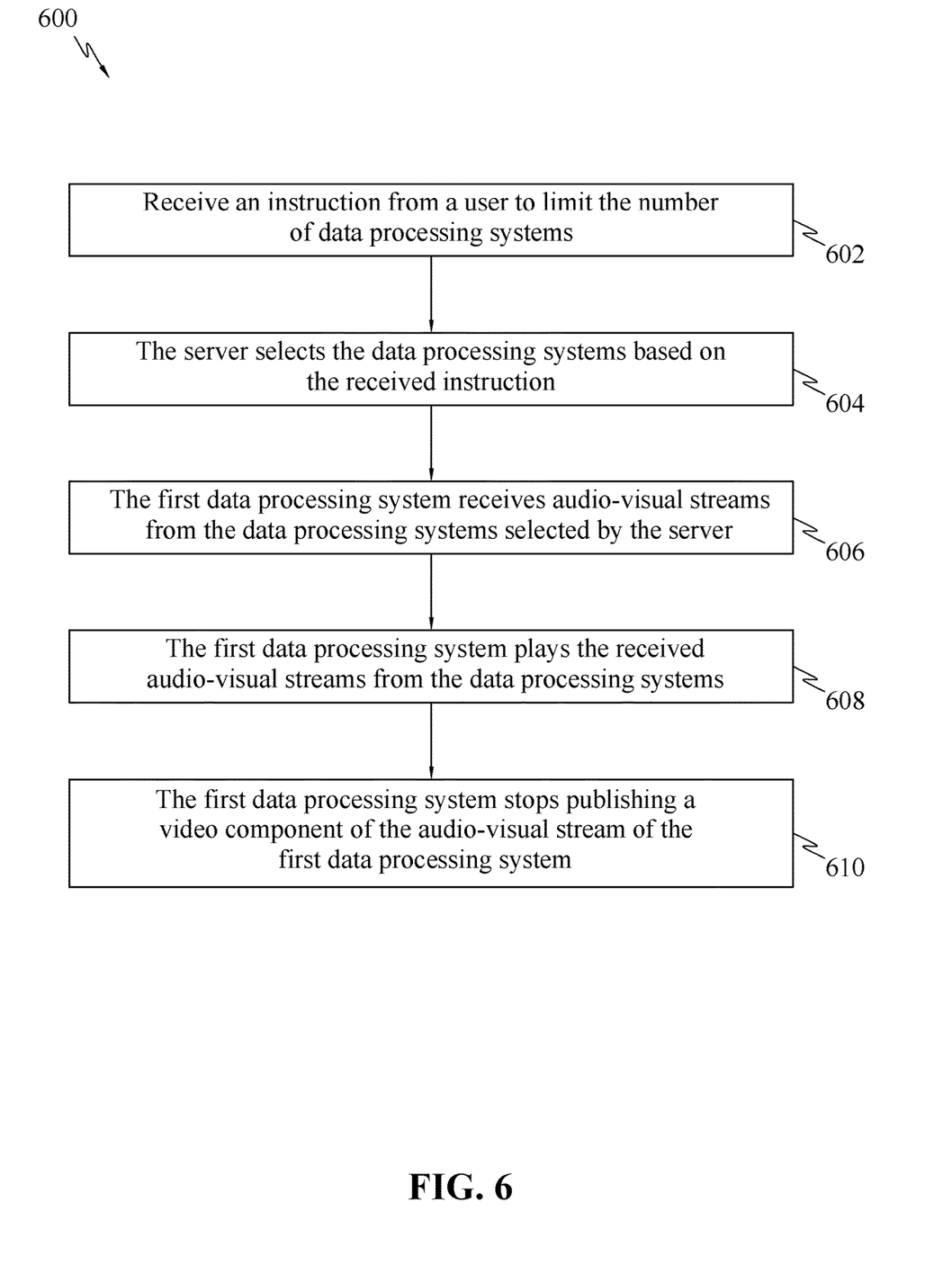
FIG. 6 is a flowchart of method of optimizing bandwidth in an online meeting in accordance with an embodiment.

FIG. 6 is a flowchart of method of optimizing bandwidth in an online meeting in accordance with an embodiment. As an example, the online meeting may be between four participants corresponding to four data processing systems (refer FIG. 1).

Upon establishing the online meeting as explained in FIG. 5, at step 602, the first data processing system 102 may be configured to receive an instruction to optimize the bandwidth from a first user associated with the first data processing system 102. The instruction may define a limit on the number of data processing systems from which an audio-visual stream is to be played on the first digital client display interface of the first data processing system 102.

As an example, there may be four participants in an online meeting and the user of the first data processing system 102 may provide an instruction that audio-visual stream from only two data processing systems has to be played in the first data processing system 102.

At step 604, the server 112 selects data processing systems, among the plurality of data processing systems, based on the instruction received from the user. As an example, after the first user provided the information that audio-visual stream from only two data processing systems has to be played in the first data processing system 102, the server 112 may select any two data processing systems between the second data processing system 104, the third data processing system 106 and the fourth data processing system 108. The method of selecting the data processing systems by the server 112 is explained in FIG. 7.

At step 606, the first data processing system 102 may receive an audio-visual stream from the data processing systems selected by the server. The first data processing system 102 may receive the audio-visual streams from the server 112 via the receiving channels.

At step 608, the first data processing system 102 may play the audio-visual streams received from the data processing systems. The first digital client display interface may play the received audio-visual streams from the data processing systems.

It shall be noted that first data processing may receive and play the audio component of the audio-visual stream of the data processing systems whose audio-visual streams are not played in the first digital client display interface of the first data processing system 102.

In one embodiment, the user can assign a priority to a data processing system to receive an audio-visual stream. As an example, the user may pin an audio-visual stream from a specific data processing system. The pinned audio-visual stream will be played on the first data processing system, wherein the number of data processing systems including the pinned data processing system, from which the audio-visual streams are played on the first digital display interface is equal to the limit of number of data processing systems as instructed by the first user. In other words, if a user limits the number of data processing system to two and further the user assigns priority to one specific data processing system, the audio-visual stream from the priority assigned data processing system will always play and the other data processing system from which the audio-visual is to be played may be selected by the server 112.

At step 610, the first data processing system 102 may stop publishing a video component of the first audio-visual stream 114, while publishing only the audio component of the first audio-visual stream 114. Therefore, other data processing systems may only receive the audio component obtained from the first microphone of the first data processing system 102.

In one embodiment, the first data processing system 102 may share at least a screen with other data processing systems. The digital client of each of the data processing system may display in the digital client display interface, visual content of the screens shared by other data processing systems in individual display windows.

In one embodiment, the processor module of each of the data processing systems may cause the digital client to, based on an input received from a user, change the size of the individual display windows, of the digital client display interface, simultaneously to equally sized larger or smaller sized windows.

In one embodiment, the processor module of each of the data processing systems may cause the digital client to, based on an input received from a user, change the size of one of the individual display windows of the digital client display interface.

Figure 7:
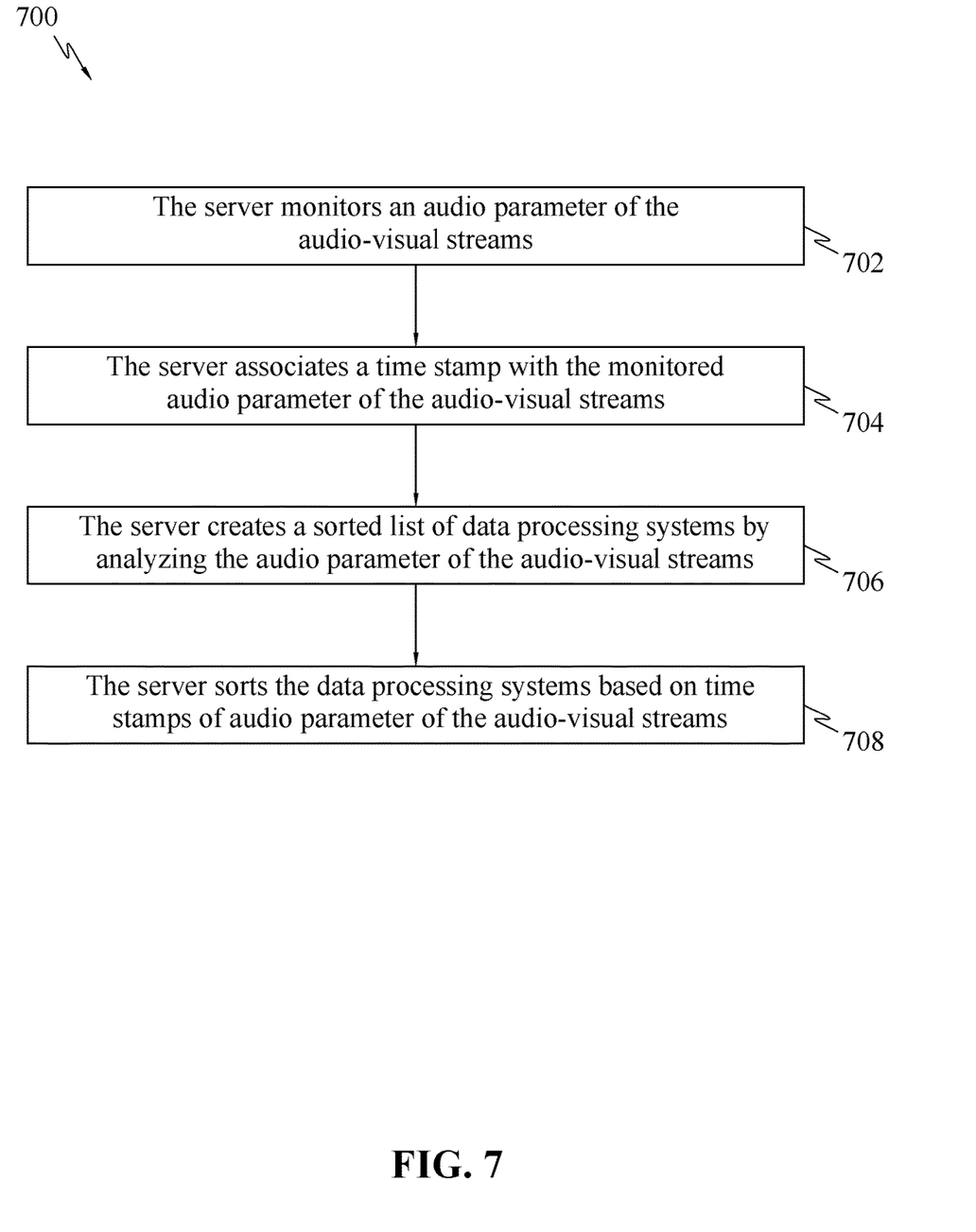
FIG. 7 is a flowchart of method of selecting the data processing systems by the server, in accordance with an embodiment.

FIG. 7 is a flowchart of method of selecting the data processing systems by the server, in accordance with an embodiment. At step 702, the server 112 may monitor an audio parameter of an audio-visual stream received from each of the data processing systems.

In one embodiment, the audio parameter monitored may be the volume level of the audio component of the audio-visual stream.

At step 704, the server 112 may associate a time stamp with the monitored audio parameter of the received audio-visual streams. The time stamp provides a temporal information regarding the audio-visual streams received.

At step 706, the server 112 may create a sorted list of data processing systems by analysing the audio parameters corresponding to the audio-visual stream received from each of the data processing systems.

At step 708, the server 112 may sort the data processing systems based on the time stamp of the audio parameter of each of the audio-visual streams received from the data processing systems.

In one embodiment, the server 112 may sort the data processing systems in an order of data processing systems whose audio-visual stream has recent time stamp to old time stamp of audio parameter of the audio-visual stream.

In one embodiment, if the time stamp of audio parameter of audio-visual streams corresponding to multiple data processing systems are same, the server 112 may use the magnitude of the audio-parameter to sort the data processing systems.

Referring to step 604, the server may use the sorted list to select the data processing systems whose audio-visual streams is to be played on the first data processing system 102. As an example, the first user may provide an instruction that audio-visual stream from only two data processing system has to be played in the first data processing system 102. Further, the server 112 may determine the two data processing systems with the most recent time stamp of audio parameter of the audio-visual stream. In other words, the server 112 determines the recent speakers in an online meeting. Further, the server 112 may communicate the audio-visual stream of the selected data processing systems with the first data processing system 102 further the communicated audio-visual streams are be played on the first digital client display interface.

Figure 8A:
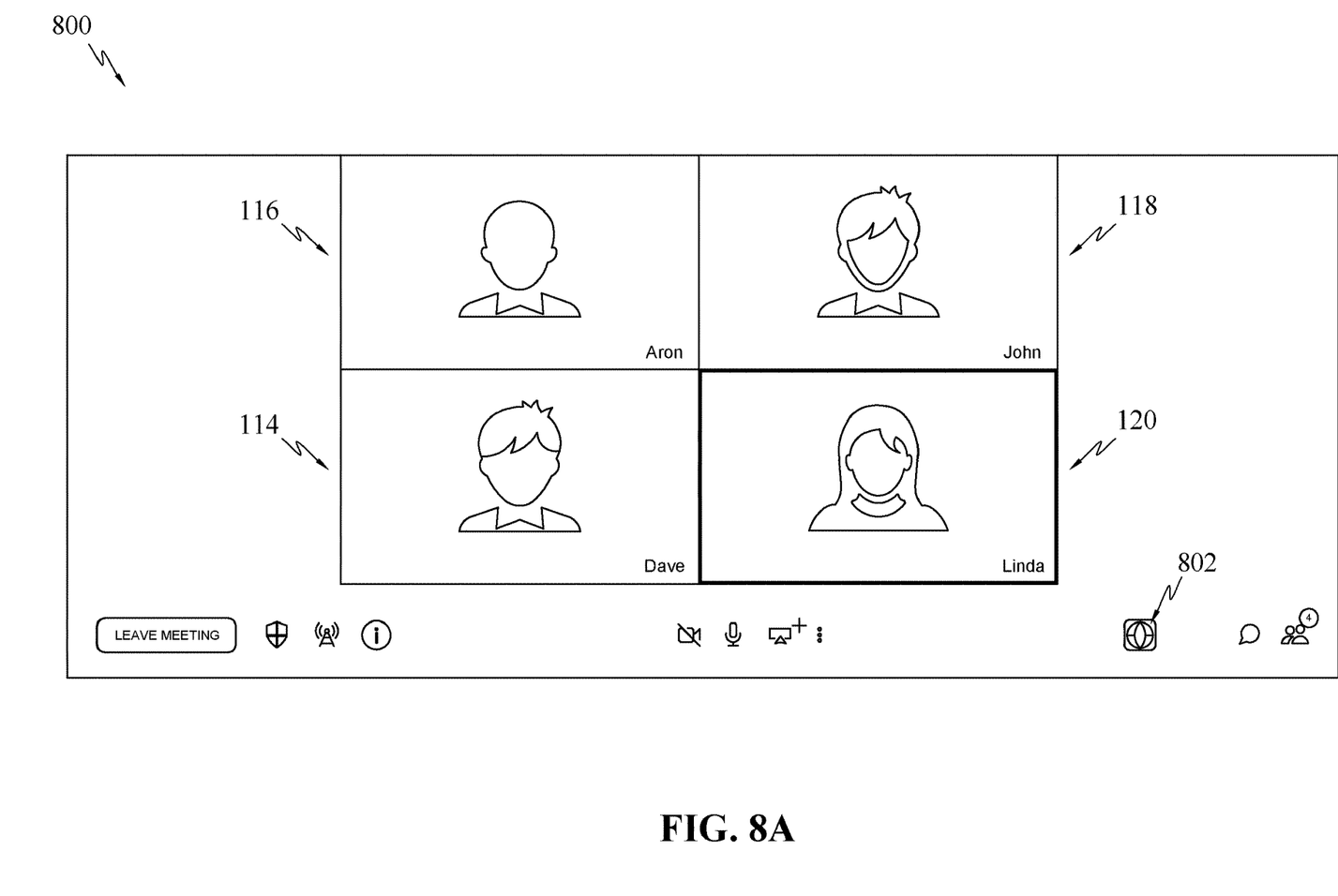
FIGS. 8A, 8B, 8C and 8D illustrates the user interface of a data processing system, in accordance with an embodiment.

The operation of the system will now be described in accordance with FIGS. 8A, 8B, 8C and 8D. Referring to FIG. 8A, the first digital client display interface 800 may play the first audio-visual stream 114, the second audio-visual stream 116, the third audio-visual stream 118 and the fourth audio-visual stream 120 from the respective first, second, third and fourth data processing systems (participants) in individual windows. The user interface 800 may display an operable icon 802 for optimizing the bandwidth. The first user may operate the operable icon 802 to optimize the bandwidth.

Figure 8B:
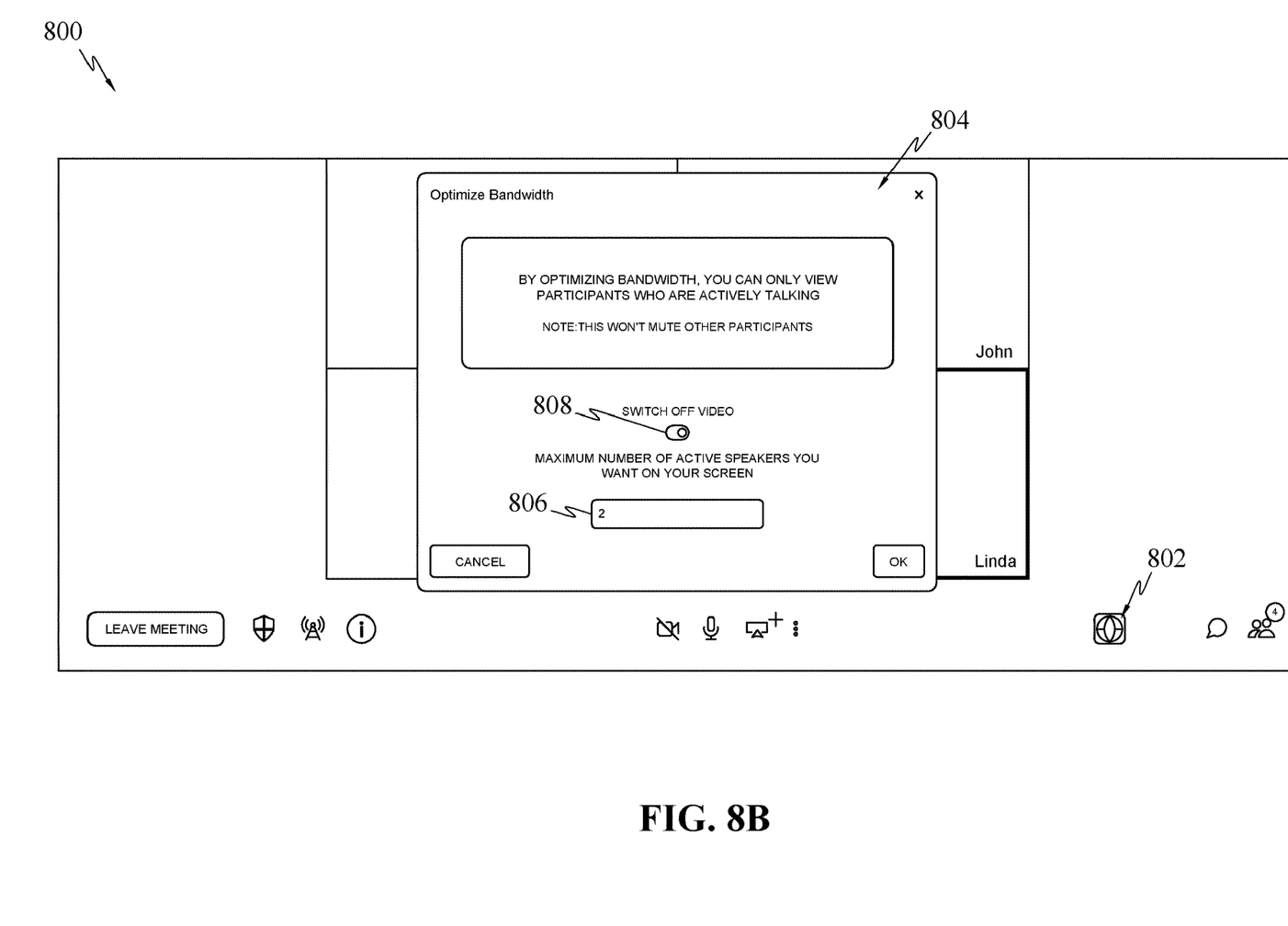

Referring to FIG. 8B, upon operating the operable icon for optimizing bandwidth, the user interface may display a screen 804 to the first user with a field 806 for inputting the number of data processing systems whose audio-visual stream is to be played in the first data processing system 102.

Further, the first user may be provided with an option 808 to stop publishing the video component of the first audio-visual stream 114 thereby saving the uplink bandwidth.

Figure 8C:
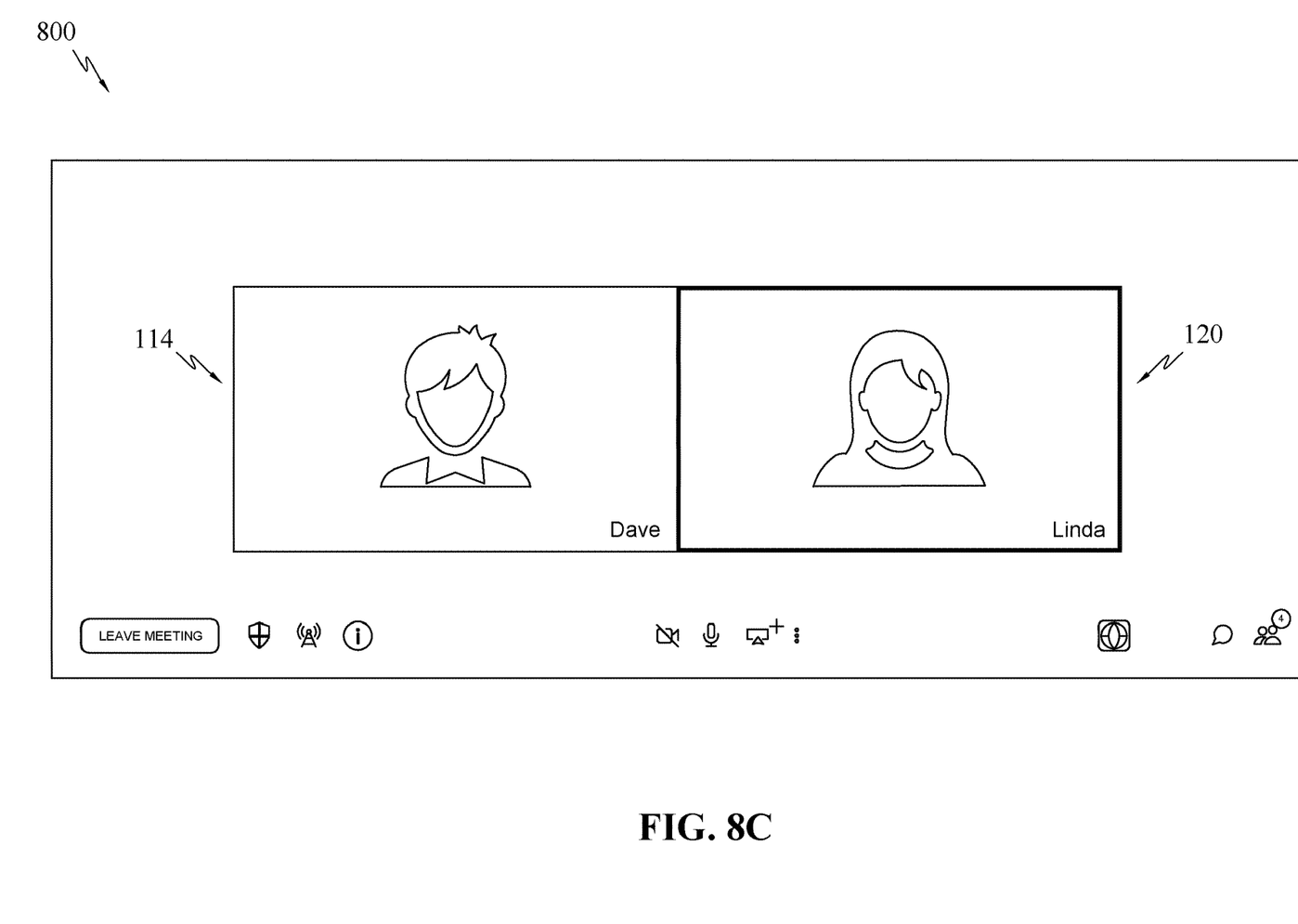

Referring to FIG. 8C, upon providing the instruction regarding limiting the number of data processing systems whose audio-visual stream is to be played in the first data processing system 102, the server may select the data processing systems whose audio-visual stream is to be played in the first data processing system 102. Further, the first digital client display interface may display the audio-visual stream (114 and 120) from the active participants.

Figure 8D:
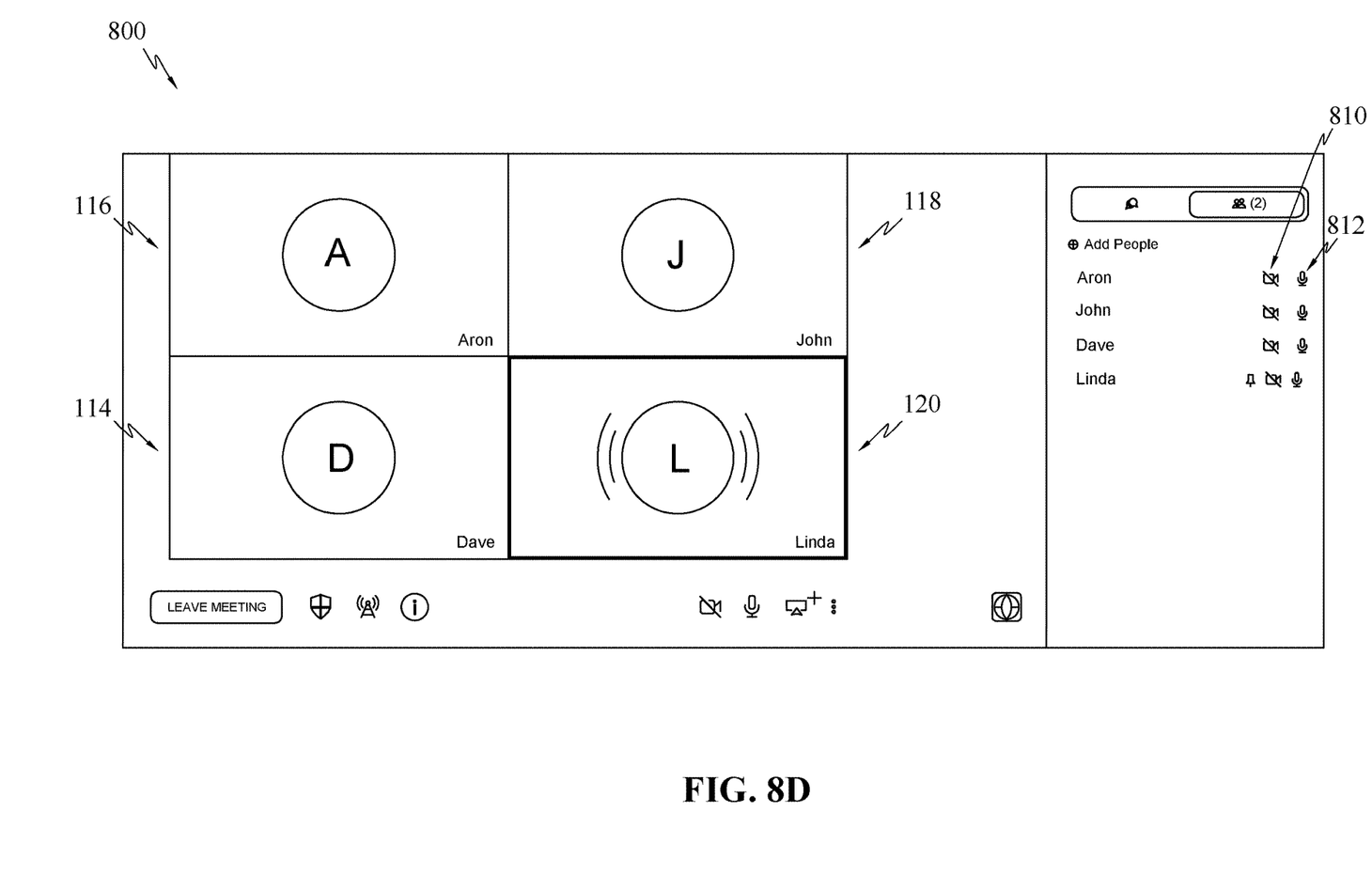

Referring to FIG. 8D, the first user may manually provide an input to the system to stop receiving the video component or the audio component of an audio-visual stream published by a specific data processing system. A first icon 810 may be operated to stop receiving the video component of the audio-visual stream from a specific data processing system and a second icon 812 may be operated to stop receiving the audio component of the audio-visual stream from a specific data processing system.

The processes described above is described as a sequence of steps, this was done solely for the sake of illustration. Accordingly, it is contemplated that some steps may be added, some steps may be omitted, the order of the steps may be re-arranged, or some steps may be performed simultaneously.

The example embodiments described herein may be implemented in an operating environment comprising software installed on a computer, in hardware, or in a combination of software and hardware.

Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

Many alterations and modifications of the present invention will no doubt become apparent to a person of ordinary skill in the art after having read the foregoing description. It is to be understood that the phraseology or terminology employed herein is for the purpose of description and not of limitation. It is to be understood that the description above contains many specifications, these should not be construed as limiting the scope of the invention but as merely providing illustrations of some of the personally preferred embodiments of this invention.

What is claimed is:

1. A system for optimizing bandwidth during an online meeting, the system comprising:
 a plurality of data processing systems, wherein each of the plurality of data processing systems is associated with a user and comprises a hardware processor, and a memory comprising a digital client and a digital client display interface, wherein the hardware processor causes the digital client to publish an audio-visual stream comprising a video component and an audio component from the corresponding data processing system; and
 a first data processing system, among the plurality of data processing systems, comprising a first hardware processor, a first digital client and a first digital client display interface, wherein the first data processing system is configured to:
  receive an instruction to optimize the bandwidth, from a first user associated with the first data processing system, by limiting the number of data processing systems from which an audio-visual stream is to be played in the first digital client display interface to a first number of data processing systems; and
  play, in the first digital client display interface, an audio-visual stream from the first number of data processing systems as instructed by the first user, wherein the data processing systems from which the audio-visual stream is played is selected based on an audio parameter of the audio-visual stream of the data processing systems.

2. The system of claim 1, wherein the first data processing system is configured to stop publishing a video component of an audio-visual stream from the first data processing system upon receiving the instruction to optimize the bandwidth, thereby saving the uplink bandwidth.

3. The system of claim 1, wherein each of the plurality of data processing systems comprises a camera and a microphone, wherein the video component and the audio component of the audio-visual stream published from each of the plurality of data processing systems is obtained from the camera and the microphone respectively of the corresponding data processing system.

4. The system of claim 1, wherein the first data processing system is configured to:
receive an input from the first user to assign a priority to a data processing system, among the plurality of data processing systems, wherein an audio-visual stream published from the data processing system which is assigned a priority is played on the first digital client display interface, wherein the number of data processing systems including the data processing system which is assigned a priority, from which the audio-visual streams are played on the first digital display interface is equal to the first number of data processing systems as instructed by the first user.

5. The system of claim 1, further comprising a remote server module, wherein, each of the data processing systems is connected to the remote server module; and
the remote server module coordinates streaming of the audio-visual streams between each of the data processing systems.

6. The system of claim 5, wherein,
the hardware processor of each of the data processing systems causes the digital client to create a publishing data channel for publishing the audio-visual stream published by the digital client, wherein each of the publishing data channels comprises a video track and an audio track for publishing the audio-visual stream; and
the hardware processor of each of the data processing systems causes the digital client to create a receiving data channel for each of the streams shared by the digital client of other data processing systems, wherein each of the receiving data channels comprises a video track and an audio track for receiving the audio-visual stream.

7. The system of claim 6, wherein the remote server module is configured to:
receive the audio-visual stream from each of the data processing systems via corresponding publishing channels; and
route the received audio-visual streams between the data processing systems.

8. The system of claim 7, wherein the remote server module is configured to:
monitor the audio parameter of the audio component of each of the audio-visual streams received from the data processing systems and respective to time stamps of the audio parameter; and
create a sorted list of data processing systems by analysing the audio parameters and their corresponding time stamps, wherein the sorting of data processing systems is based on the time stamps of the audio parameters of the audio-visual streams received from the data processing systems.

9. The system of claim 8, wherein the data processing systems are sorted by time stamps of the audio parameter of their respective audio-visual streams in the order of recent to old time stamps.

10. The system of claim 8, wherein when the time stamps of two or more audio parameters of different audio-visual streams are same, the magnitude of the audio parameter is used to sort the list of data processing systems in the order of high to low magnitude of the audio parameter.

11. The system of claim 8, wherein the remote server module selects data processing systems from the sorted list whose audio-visual stream has to be played on the first digital client display interface of the first data processing system, wherein the number of data processing systems selected is equal to the limit of number of data processing systems as instructed by the first user.

12. The system of claim 11, wherein the remote server module selects data processing systems that have recent time stamps of the audio parameter of audio-visual stream.

13. The system of claim 8, wherein the audio parameter of audio-visual streams that is monitored corresponds to volume level of the audio component.

14. The system of claim 1, wherein the first data processing is configured to receive an instruction from the first user to manually stop receiving an audio component or a video component of an audio-visual stream published from a particular data processing system.

15. The system of claim 1, wherein the digital client of each of the plurality of data processing systems is configured to share at least a screen with other data processing systems.

16. The system of claim 15, wherein,
the hardware processor of each of the data processing systems causes the digital client of the data processing system to display in the digital client display interface, visual content of the screens shared by other data processing systems in individual display windows.

17. The system of claim 16, wherein the hardware processor of each of the data processing systems causes the digital client to, based on an input received from the user, change the size of the individual display windows, of the digital client display interface, simultaneously to equally sized larger or smaller sized windows.

18. The system of claim 16, wherein the hardware processor of each of the data processing systems causes the digital client to, based on an input received from the user, change the size of one of the individual display windows of the digital client display interface.

* * * * *